United States Patent
Windorfer

(10) Patent No.: US 10,514,701 B2
(45) Date of Patent: Dec. 24, 2019

(54) SELF-PROPELLED SURFACE TREATING DEVICE

(71) Applicant: Vorwerk & Co. Interholding GmbH, Wuppertal (DE)

(72) Inventor: Harald Windorfer, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 224 days.

(21) Appl. No.: 15/720,118

(22) Filed: Sep. 29, 2017

(65) Prior Publication Data
US 2018/0095472 A1 Apr. 5, 2018

(30) Foreign Application Priority Data
Sep. 30, 2016 (DE) .................. 10 2016 118 650

(51) Int. Cl.
*G05D 1/02* (2006.01)
*A47L 11/40* (2006.01)
*G05D 1/00* (2006.01)

(52) U.S. Cl.
CPC ........ *G05D 1/0227* (2013.01); *A47L 11/4008* (2013.01); *G05D 1/0077* (2013.01); *G05D 1/0234* (2013.01)

(58) Field of Classification Search
CPC ......... G05D 1/0227; G05D 2201/0203; G05D 1/0016; G05D 1/0022; G05D 1/0033; G05D 1/0077; G05D 1/021
See application file for complete search history.

(56) References Cited

U.S. PATENT DOCUMENTS

| | | | |
|---|---|---|---|
| 6,941,199 B1* | 9/2005 | Bottomley | G05D 1/0221 701/23 |
| 2010/0306932 A1* | 12/2010 | Schneider | G05D 1/0227 15/3 |
| 2013/0241217 A1* | 9/2013 | Hickey | B60R 19/483 293/117 |
| 2014/0182627 A1* | 7/2014 | Williams | A47L 11/30 134/21 |
| 2016/0274580 A1* | 9/2016 | Jung | G05D 1/0022 |
| 2018/0095472 A1* | 4/2018 | Windorfer | A47L 11/4008 |

FOREIGN PATENT DOCUMENTS

DE    10 2013 106 294 A1    12/2014

* cited by examiner

*Primary Examiner* — Redhwan K Mawari
(74) *Attorney, Agent, or Firm* — Collard & Roe, P.C.

(57) ABSTRACT

A self-propelled surface treating device, in particular a cleaning robot, with a device housing and a collision detection device for detecting a collision between the surface treating device and an obstacle, wherein the collision detection device has at least one touch-sensitive contact sensor. In order to protect the surface treating device against impacts in the vertical direction, it is proposed that the touch-sensitive contact sensor be a vertical contact sensor, which is arranged on the device housing in such a way that its detection area is vertically aligned during a movement with the surface treating device conventionally oriented, so that the vertical contact sensor is configured to detect a force acting vertically on the surface treating device.

9 Claims, 4 Drawing Sheets

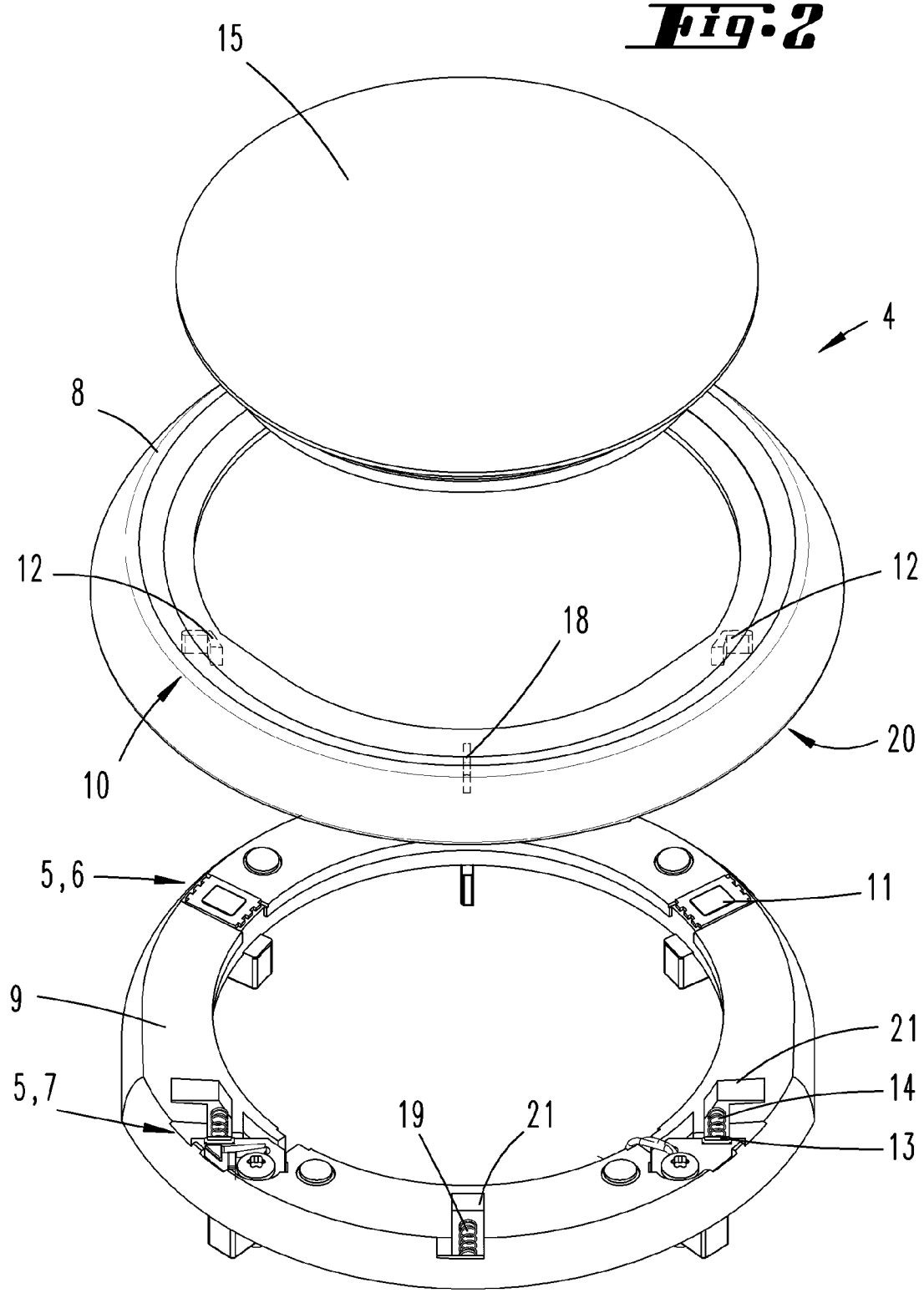

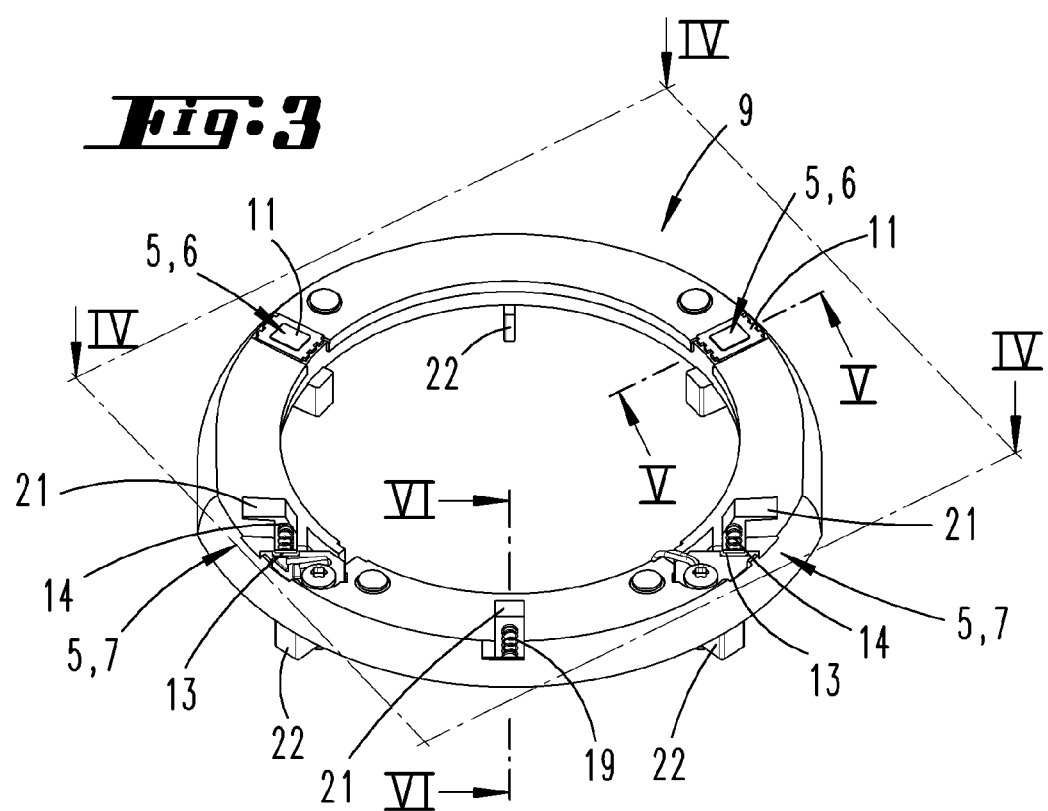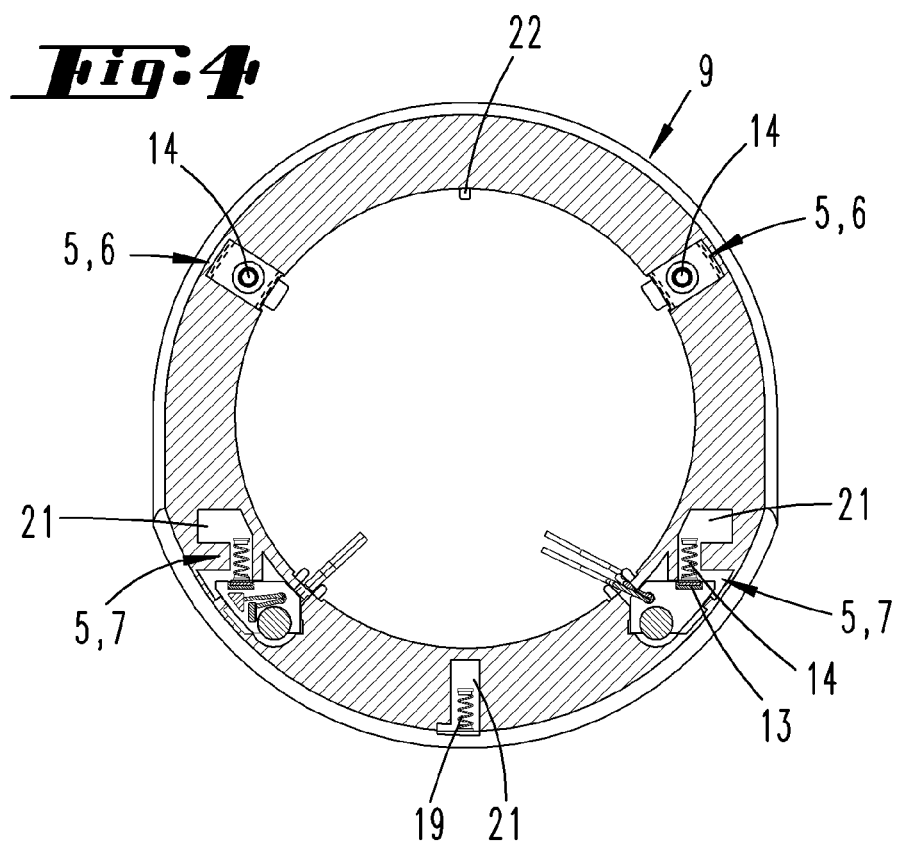

SELF-PROPELLED SURFACE TREATING DEVICE

CROSS REFERENCE TO RELATED APPLICATIONS

Applicant claims priority under 35 U.S.C. § 119 of German Application No. 10 2016 118 650.3 filed on Sep. 30, 2016, the disclosure of which is incorporated by reference.

AREA OF TECHNOLOGY

The invention relates to a self-propelled surface treating device, in particular a cleaning robot, with a device housing and a collision detection device for detecting a collision between the surface treating device and an obstacle, wherein the collision detection device has at least one touch-sensitive contact sensor.

PRIOR ART

Self-propelled surface treating devices are sufficiently known. These are used in particular in the household sector for treating a surface, in particular for vacuuming and/or washing floor coverings.

For purposes of orientation within an environment, such surface treating devices have a distance measuring device, for example, which measures distances to obstacles within the environment. A map of the environment is generated from the measured distance values along with any additional potentially measured values of other sensors, and is used to navigate and self-localize the surface treating device within the environment. Furthermore, the distance measuring device also serves to detect obstacles within a traversed path of the surface treating device, so that obstacles within the environment can be circumvented to avoid a collision. For example, the distance measuring device uses a triangulation measuring method for a measurement, in which light signals are emitted by a light source. The light signals reflected on an obstacle are subsequently received by a sensor of the distance measuring device, and preferably processed inside of the surface treating device. A control signal is generated as a function of the processing result, for example to stop a movement by the surface treating device and/or introduce an evasive maneuver or the like.

For example, publication DE 10 2013 106 294 A1 discloses a surface treating device with a distance measuring device, which is protected by a housing part that is formed at the top on the device housing and has a contact sensor. The contact sensor can detect a collision between the housing part and an obstacle in the horizontal direction of movement. This makes it possible to detect an impact between the surface treating device, specifically the aforementioned housing part, and an obstacle located in front of the distance measuring device. The traversed path of the surface treating device can thereupon be changed so that the surface treating device circumvents the obstacle, thereby preventing damage to the distance measuring device.

Even though the aforementioned collision protection device has proven itself relative to obstacles located in front of the surface treating device, it enables no protection for obstacles placed above the detection area of the distance measuring device, for example, such as inclined skirting boards, accessible furniture with non-horizontal bottom side, sagging sofas and the like.

SUMMARY OF THE INVENTION

Proceeding from the aforementioned prior art, it is thus the object of the invention to provide a surface treating device that is protected against vertical impacts.

In order to achieve the aforementioned object, it is proposed that the touch-sensitive contact sensor be a vertical contact sensor, which is arranged on the device housing in such a way that its detection area is vertically aligned during a movement with the surface treating device conventionally oriented, so that the vertical contact sensor is configured to detect a force acting vertically on the surface treating device.

In this embodiment, the surface treating device can now detect obstacles that protrude into a traversed path of the surface treating device coming from above relative to a spatial direction, and can collide with at least one upper partial housing region of the surface treating device as the surface treating device continues to move, for example specifically with a partial region of the device housing sensitive to shock that has a distance measuring device. As a consequence, the surface treating device can adjust its traversing strategy in time, before the obstacle collides with the distance measuring device protected by the partial housing region. For example, a vertical collision case can arise if the surface treating device becomes stuck or jammed under pieces of furniture with a low ground level. In like manner, a force can be exerted on the surface treating device in a vertical direction by a radiator suspended on a wall, overhanging regions of a skirting board, a varying ground level of the surface to be treated under pieces of furniture and the like. As a whole, impacts that act vertically on the surface treating device with at least one directional component are thus detected and used for adjusting the traversing strategy of the surface treating device. The formulation to the effect that the detection area is aligned vertically here includes all such arrangements in which the detection area has at least one component in a vertical direction. For example, this also includes a vertical contact sensor whose detection area is directed in a diagonal direction, and thus has both a horizontal and vertical effective direction. The surface treating device especially advantageously has several vertical contact sensors, which are arranged at various positions of the collision detection device or device housing. This makes it possible to detect collisions with suspended obstacles in different partial areas of the surface treating device. The detection areas of the vertical contact sensors advantageously come to overlap, so that the totality of detection areas covers as much of the upper side of the device housing as possible, and protects it against vertical impacts. As a result, any blind spots of the collision detection device which could cause damage to the distance measuring device can be precluded.

It is further proposed that the collision detection device have two housing parts that can move relative to each other, of which a first housing part can be displaced relative to a second housing part owing to a collision with an obstacle. In particular, it is proposed that one of the housing parts have the vertical contact sensor, and the other housing part have an actuating device for actuating the vertical contact sensor. One of the two housing parts, specifically an unmovable housing part, can be integrally designed with other unmovable housing parts of the device housing, in particular with a hood that envelops the chassis of the surface treating device and components like a motor, fan, dust collection chamber and the like. An integral configuration would be especially suitable. Alternatively, the unmovable housing part could be joined with the other unmovable housing parts by means of a welded joint, adhesive bond or the like, for example. The contrastingly movable housing part is advantageously slideably mounted on the unmovable housing part. In particular, the movable housing part can lie on the unmovable housing part. The movement of the first housing part relative to the second housing part is advantageously limited by a guide with a stop, so that the two housing parts cannot be inadvertently detached from each other. Also recommended is a spring-loaded arrangement of the movable housing part on the unmovable housing part.

During a collision between the surface treating device and an obstacle, the obstacle pushes ahead of the first housing part, which thereupon is displaced relative to the second housing part, in particular shifted. Alternatively, the first housing part could also be pivoted relative to the second housing part by the impact. The first housing part is here placed and formed on the device housing so as to protrude over additional housing parts of the device housing in preferably a vertical direction, so that an obstacle located above the surface treating device comes into contact with the first housing part before other housing parts of the device housing or other measuring devices of the surface treating device sensitive to shock can come into contact with the obstacle, and in the worst case scenario be damaged in the process. During a collision with the obstacle, the first housing part is moved in a vertical direction toward the second housing part, as a result of which the actuating device establishes a direct or indirect operative connection with a corresponding vertical contact sensor, in particular coming into contact with the latter, and a signal output about the collision is initiated. In an especially simple case, the actuating device can be a partial wall area of the first or second housing part. For example, if the first housing part is the movable housing part, its lower side can represent an actuating device, which acts on a vertical contact sensor, for example one located on the upper side of the second housing part, in particular pressing on the latter. With the first and second housing parts in a neutral position relative to each other, i.e., in the absence of an obstacle on the first housing part, the actuating device and vertical contact sensor are advantageously spaced apart from each other or at least situated relative to each other in such a way that the actuating device exerts no force on the vertical contact sensor that might lead to a signal being triggered.

Proposed as especially advantageous is that at least one of the housing parts be designed to extend annularly within a horizontal plane, wherein a distance measuring device designed to measure distances to obstacles is arranged inside of the annular shape as viewed in a vertical direction, and wherein the distance measuring device is arranged in particular below the annular housing part relative to the vertical direction. This configuration makes it possible to protect a distance measuring device situated on the surface treating device against contact with an obstacle via one or both housing parts. The distance measuring device is here preferably located centrally on a symmetrical axis of the annular shape, i.e., centrally inside of the ring relative to a vertical view from above. As a consequence, the distance measuring device is protected against lateral impacts that otherwise might be caused by obstacles located in the same horizontal plane as the distance measuring device. In the especially preferred embodiment in which the distance measuring device is additionally arranged in a plane under the annular housing part relative to the vertical direction, the distance measuring device is additionally also protected against impacts in a vertical direction, specifically against impacts caused by obstacles, for example which are suspended in the environment and can act on the distance measuring device with at least a vertical force component. While the annular shape can be a circular ring shape, other annular shapes are conceivable, for example oval, polygonal or square annular shapes or others. In particular in conjunction with a cover element placed on the annular shape as a protective cap, the annular shape here offers advantageous protection against impacts from above. It can be provided in particular that the two housing parts have a configuration as described in publication DE 10 2013 106 294 A1. The distance measuring device is here spanned by a circular ring part, which extends in a plane above the distance measuring device aligned transverse to the rotational axis of the distance measuring device. The housing part designed as a circular ring part is supported on the device housing by means of feet distributed around the circumference, wherein an optical signal emitted by the distance measuring device is guided between the feet and out of the device housing or housing part. Optical deflectors, such as prisms, mirrors and the like, can be used if needed. Given the larger diameter of the circular ring shaped housing part as compared to the distance measuring device, the feet extend in an area radially outside of the distance measuring device, preferably in a detection area plane in which optical signals are emitted and received.

Preferably situated above a lower second housing part relative to the vertical direction is an upper first housing part, which essentially also has an annular design, and provides either an actuating device for a vertical contact sensor of the second housing part or a vertical contact sensor for an actuating device of the second housing part. While the two housing parts preferably have essentially the same outer diameter, the displaceable housing part preferably protrudes a bit over the housing part immovably joined with the device housing relative to a horizontal plane, so that the latter can also absorb horizontal impacts. It is recommended in particular that the movable housing part be spring-loaded.

It is further proposed that the actuating device have a button, a contact surface and/or a stop. In particular, the actuating device can here have allocated to it a spring element, which increases a contact travel of the actuating device, and thereby influences the sensitivity of the collision detection device given the detection of a collision with an obstacle. The button, contact surface and/or stop are here advantageously arranged on a partial area of the first or second housing part, which lies opposite the vertical contact sensor located on the second or first housing part. The actuating device acts either directly or alternatively indirectly, e.g., with a spring element interspersed, on the vertical contact sensor, and as force is transmitted generates a corresponding switching signal, which indicates the collision with an obstacle. The same can also take place by way of a contact surface of the actuating device, for example which represents a lower side of a first, upper housing part, wherein the corresponding lower housing part has a protruding vertical contact sensor or a protruding spring element, so that a force can be exerted by the support surface on the vertical contact sensor. Alternatively, the actuating device can also have a stop, for example which is designed correspondingly to a vertical contact sensor in terms of shape, and exerts a force on the actuating device through a relative displacement of the two housing parts relative to each other. The stop of the one housing part can here especially advantageously engage into the recess of the other housing part, wherein the recess keeps the stop positioned in such a way as to expose the vertical contact sensor to a force.

In addition, however, a button can also be vertically movably arranged on the housing part that also exhibits a vertical contact sensor. Given a collision between the surface treating device and an obstacle, the button is here pressed down by a corresponding partial area of the other housing part, so that a corresponding force is exerted on the vertical contact sensor. In this embodiment, one and the same housing part thus has both an actuating device and a vertical contact sensor, but the other housing part simultaneously also comprises part of the actuating device.

In addition, it is proposed that the first housing part have the actuating device, and that the second housing part have the vertical contact sensor, wherein the first housing part is located above the second housing part during a movement relative to a conventional orientation of the surface treating device. As a consequence, the first housing part preferably rests on the second housing part. In addition, the actuating device can correspondingly also be located above the vertical contact sensor relative to the vertical direction. This is especially advantageous, since the weight force of the first housing part or actuating device is as a result directed toward the vertical contact sensor, making it especially easy for the vertical contact sensor to respond upon actuation of the actuating device. However, it can basically also be provided that the vertical contact sensor be located above the actuating device relative to the vertical direction, so that the vertical contact sensor is moved toward the actuating device against the weight force.

It is preferably proposed that the vertical contact sensor be located at the front on the housing part relative to a conventional orientation of the surface treating device during a movement in the forward direction. As a consequence, while the surface treating device moves forward in a conventional manner, a collision with an obstacle can already be detected before the distance measuring device has made its way into the area of the obstacle. This makes it possible to modify a traversing strategy for the surface treating device early on, before damage to the distance measuring device takes place. It can especially advantageously be provided that the collision detection device have a plurality of vertical contact sensors, which are distributed around the distance measuring device relative to a vertical viewing direction, so that the distance measuring device is protected independently of a direction of movement of the surface treating device, i.e., even when traveling in reverse or cornering. When using a plurality of vertical contact sensors, adjacent vertical contact sensors are advantageously arranged in such a way that their detection areas overlap, thereby preventing blind spots from arising. An entire detection area of the vertical contact sensors here advantageously covers an angular range of at least 180° around the distance measuring device. In particular, it can be provided that the detection area of the vertical contact sensors cover an angular range of up to 360°.

In addition, it is proposed that the collision detection device have at least one horizontal contact sensor, which is arranged on the device housing in such a way that its detection area is aligned parallel to a direction of movement during a movement given a conventionally oriented surface treating device, so that the horizontal contact sensor is designed to detect a force acting horizontally on the surface treating device. This embodiment, in which the collision detection device has both at least one vertical contact sensor and at least one horizontal contact sensor, makes it possible to respond to obstacles that exert a horizontal force, a vertical force or both a horizontal and vertical force on the collision detection device. As a consequence, the collision detection device has a 3D sensitivity with respect to obstacles, so that collisions with obstacles can be detected not just in a horizontal direction, but also in a vertical direction, and correspondingly lead to an adjustment of the traversing strategy for the surface treating device. In addition, the received signals of the collision detection device can also be evaluated to determine where the respective obstacle is located inside of a space. For example, if a vertical contact sensor on the right front side of the surface treating device and a horizontal contact sensor on the right front side of the surface treating device simultaneously respond to an impact, it can be assumed that the obstacle is one which hits the surface treating device on the front right in both a horizontal direction and a vertical direction. For example, this can be an inclined skirting board toward which the surface treating device travels, or a sagging mattress part under a bed or the like. The surface treating device here advantageously has a control and evaluation device, which is connected with the collision detection device and can correlate the signals of the vertical contact sensors and horizontal contact sensors with and/or links, so as to vary a behavioral pattern of the surface treating device as needed.

Especially preferably proposed is an embodiment that has at least two vertical contact sensors and at least two horizontal contact sensors, which are annularly arranged on the device housing in such a way as to envelop the distance measuring device as viewed in a vertical direction. For example, it can be provided that a frontal area of the device housing relative to a conventional movement of the surface treating device have two vertical contact sensors, which detect vertical impacts in an angular range of approx. 180° around the distance measuring device, while two or more horizontal contact sensors are located in a rear area of the device housing relative thereto, and detect horizontal impacts, for example by obstacles acting frontally on the device housing. The number and position of the individual contact sensors can here always be reconciled in coordination with software for influencing the behavioral strategy for the surface treating device, so as to trigger various behavioral patterns of the surface treating device.

In addition, it is proposed that the contact sensor have an electronic switch, an inductive or capacitive position sensor, a piezo element, a strain gauge, a conductive foam and/or a light barrier. The force caused by a collision with the obstacle that acts on the collision detection device, in particular a resultant displacement of the housing parts relative to each other, can thus be measured in different ways. In particular, the collision can be directly or indirectly acquired via pressure or force-sensitive sensors, such as piezo elements or strain gauges. In addition, use can be made of alternative measuring procedures with position sensors, light barriers, conductivity measurements and the like.

Finally, it is proposed that a spring element be arranged between the actuating device and contact sensor, so that the actuating device can act on the contact sensor by way of the spring element. This embodiment makes it possible to increase the contact travel, so that the contact sensor only detects a collision with an obstacle if a specific threshold for the acting force was exceeded.

BRIEF DESCRIPTION OF THE DRAWINGS

The invention will be explained in more detail below based on exemplary embodiments. Shown on:

FIG. 2 is a perspective, exploded view of a collision detection device,

FIG. 3 is a perspective view of a lower housing part of the collision detection device, FIG. 4 is a cross section of the housing part according to FIG. 3.

DESCRIPTION OF THE EMBODIMENTS

Figure 1:
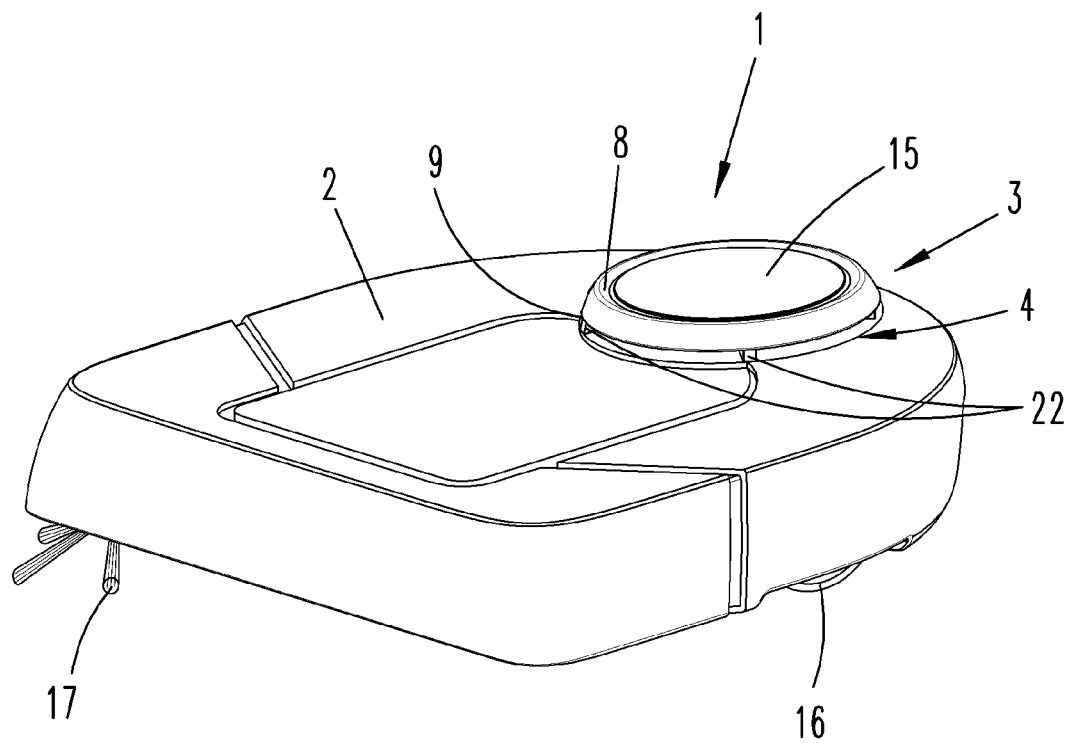
FIG. 1 is a surface treating device with a collision detection device.

FIG. 1 shows a surface treating device 1, which is here designed as a self-propelled robot vacuum. The surface treating device 1 has a device housing 2, the lower side of which facing a surface to be cleaned is provided with a wheels 16 driven by an electric motor along with a brush 17 also driven by an electric motor that protrudes over the lower edge of a housing floor. In the area of the brush 17, the surface treating device 1 further has a suction mouth opening, through which air loaded with suction material can be aspirated into the surface treating device 1 by means of a motor-driven blower unit. The surface treating device 1 has a rechargeable battery (not shown) for supplying electrical power to the individual electrical components of the surface treating device 1, for example for driving the wheels 16 and brush 17 as well as any other provided electronics.

The surface treating device 1 has a distance measuring device 3, which is designed to detect obstacles within an environment of the surface treating device 1. The distance measuring device 3 has a detection area within which present obstacles can be detected. For example, the distance measuring device 3 is here a triangulation measuring device, which can measure distances to obstacles within the environment of the surface treating device 1. A sensor in this distance measuring device 3 specifically has a laser diode, whose emitted light beam is guided out of the device housing 2 of the surface treating device 1 via a deflector, and can be rotated around a rotational axis that is perpendicular in the depicted orientation of the surface treating device 1, thereby giving rise to a 360° rotating detection area. This enables an all-round distance measurement around the surface treating device 1. This distance measuring device 3 can be used to measure the environment of the surface treating device 1 in a preferably horizontal plane, i.e., in a plane parallel to the surface to be cleaned. As a result, the surface treating device 1 can be moved while avoiding a horizontal collision with obstacles. The measuring data recorded by means of the distance measuring device 3, which represent distances to obstacles and/or walls in the environment, are used to generate a map of the environment. In addition, for example, the environmental map can also be generated based upon odometry data for the wheels 16, which are used for comparing the data measured by means of the triangulation measuring device. As a consequence, the distance measuring device 3 designed as a triangulation measuring device here performs two simultaneous jobs, specifically scanning the environment of the surface treating device 1 for developing an environmental map on the one hand, and detecting obstacles so as to avoid a collision on the other.

The surface treating device 1 further has a collision detection device 4, which here has several touch-sensitive contact sensors 5 (not shown on FIG. 1). The collision detection device 4 is arranged above the device housing 2 adjacent to the distance measuring device 3, and consists of an annular first housing part 8 and an annular second housing part 9. The first housing part 8 lies above the second housing part 9 relative to a vertical direction, and is also covered by a cover element 15. Situated below the cover element 15 and centrally inside or below the housing parts 8, 9 is the distance measuring device 3, or at least the impact-sensitive component of the distance measuring device 3, for example a sensor, an optical deflector and the like.

FIG. 2 shows the two housing parts 8, 9 and the cover element 15. FIG. 3 also shows a magnified view of the lower, second housing part 9. In the orientation of the housing parts 8, 9 depicted, a leading front of the surface treating device during the forward movement of the surface treating device 1 faces away from the observer in the sheet plane.

Specifically, the second housing part 9 has a collision detection device 4 with a total of four contact sensors 5, namely two vertical contact sensors 6 and two horizontal contact sensors 7. The two vertical contact sensors 6 are here arranged on the front side of the second housing part 9 relative to a conventional forward movement of the surface treating device 1. In contrast, the two horizontal contact sensors 7 are arranged on a trailing partial area of the second housing part 9. As a result of this configuration, the vertical contact sensors 6 are thus situated in a leading partial area of the collision detection device 4, which would come into contact with an obstacle first during a conventional forward movement of the surface treating device 1.

The vertical contact sensors 6 here each have a button 11, which protrudes over a surface plane of the second housing part 9 facing in the direction of the first housing part 8, i.e., in a vertical direction, and can move relative to the second housing part 9. For example, the button 11 can be made out of a deformable material, e.g., an elastomer, which deforms when exposed to a vertical force and moves downward, i.e., toward the second housing part 9. Located under the button 11 is a spring element 14 (not shown on FIG. 3), which in turn is operatively connected with a switch 13 (also not shown on FIG. 3). The two vertical contact sensors 6 are arranged on the second housing part 9 at such a distance as to essentially cover a detection area of roughly 180° of the annular shape of the housing parts 8, 9, namely the frontally arranged area relative to the forward movement of the surface treating device 1.

In contrast, the two horizontal contact sensors 7 are arranged in a partial area of the second housing part 9 situated on the rear side of the second housing part 9 relative to a conventional forward movement of the surface treating device 1. The horizontal contact sensors 7 each have an electronic circuit 13 embedded in a recess 21 of the second housing part 9, as well as a spring element 14 that is operatively connected with the switch 13. The horizontal contact sensor 7 has allocated to it a corresponding stop 12, which is formed on the first housing part 8 (see FIG. 2) and correspondingly engages into the recess 21 in terms of shape (with the two housing parts 8, 9 in an assembled state). The stop 12 is operatively connected with the switch 13 by way of the spring element 14. The stop 12 represents an actuating device 10 for the switch 13, and acts against the switch 13 during a horizontal movement of the first housing part 8.

The second housing part 9 further has an additional recess 21, which is formed between the two horizontal contact sensors 7. A spring element 19 is located inside of the recess 21. With the first housing part 8 and second housing part 9 in an assembled state, a corresponding contact element 18 of the first housing part 8 engages into the recess 21, namely next to the spring element 19. The recess 21 and contact element 18 together serve as a guide for moving the first housing part 8 relative to the second housing part 9. The movement is here dampened by the spring element 19.

FIG. 2 illustrates the interplay between the first housing part 8 and second housing part 9, in particular as relates to the contact element 18 formed on the first housing part 8, which is intended for engaging into the corresponding recess 21 of the second housing part 9, and the stop 12 of the first housing part 8, which is intended for correspondingly engaging into the recess 21 of the second housing part 9 in terms of shape. For purposes of interaction with the buttons 11 of the two vertical contact sensors 6, the first housing part 8 has a contact surface 20 slideably mounted on the second housing part 9 and in particular on the buttons 11 with the two housing parts 8, 9 in an assembled state.

FIG. 4 shows a cross section of the second housing part 9 according to the IV-IV line on FIG. 3. Visible here in addition to FIGS. 2 and 3 is the spring element 14 of the vertical contact sensor 6, which can be contracted in a vertical direction by actuating the button 11.

Figure 5:
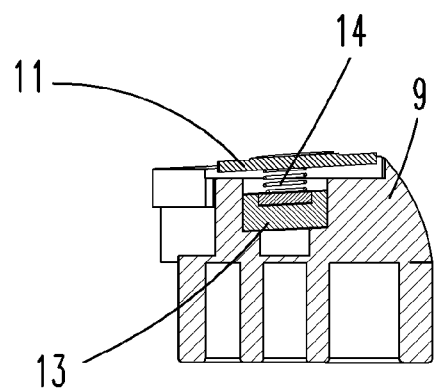
FIG. 5 is a longitudinal section through a vertical contact sensor of the collision detection device.

FIG. 5 shows a cross section through a partial area of the second housing part 9 according to the V-V line on FIG. 3. The cross section runs through a vertical contact sensor 6, and shows the button 11 that protrudes over the surface plane of the housing part 9. Located under the button 11 is the spring element 14, which can be downwardly contracted by actuating the button 11, and as the contact travel lengthens acts on the electronic switch 13, which is arranged below the spring element 14 and thereupon outputs a signal associated with a vertical collision with an obstacle.

Figure 6:
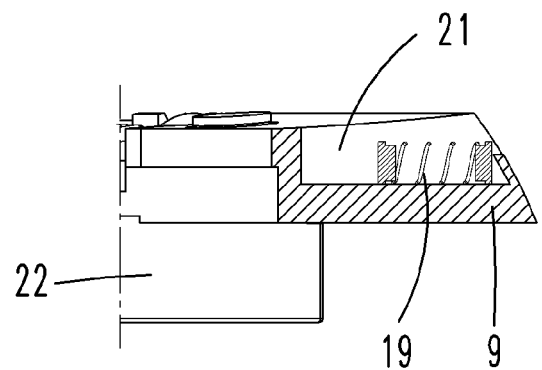
FIG. 6 is a longitudinal section according to line VI-VI on FIG. 3.

Finally, FIG. 6 shows a cross section through another partial area of the second housing part 9 according to the VI-VI line on FIG. 3. The cross section is guided through the recess 21 with the spring element 19 situated therein. The partial area of the recess 21 remaining next to the spring element is visible, and serves to engage through the contact element 18 of the first housing part 8.

The invention will be described below based on a collision between the surface treating device 1 and an obstacle, which exerts an impact force on the collision detection device 4 in both a horizontal and vertical direction. For example, such an obstacle can be an obstacle suspended on a wall close to the ground, which touches the first housing part 8 of the collision detection device 4 above the detection plane of the distance measuring device 3. For example, such an obstacle can be a sagging portion of a lower side of a sofa located outside the detection plane of the distance measuring device 3, and sags so deeply that the first housing part 8 and potentially the cover element 15 collides with the latter.

For example, during a collision in the forward direction of the surface treating device 1, the obstacle impacts an area of the first housing part 8 located between the two vertical contact sensors. Since the first housing part 8 is slideably mounted on the second housing part 9, the first housing part 8 is displaced relative to the second housing part 9, namely along the guide of the recess 21 of the second housing part 9 and the corresponding contact element 18 of the first housing part 8. At the same time, the vertically acting force component of the impact presses the first housing part 8 downward toward the second housing part 9, so that the contact surface 20 of the first housing part 8 presses on the button 11 of the vertical contact sensors 6. The displacement of the first housing part 8 relative to the second housing part 9 triggers a collision signal at the electronic circuits 13 of the contact sensors 5, namely at both the vertical contact sensors 6 and horizontal contact sensors 7. The collision signal is further processed by an evaluation and control device of the surface treating device 1 with an eye to determining which contact sensors 5 have detected a collision, and in which position the obstacle is located relative to the surface treating device 1. In the exemplary case, the evaluation and control device here concludes that the obstacle is located in front of and above the surface treating device 1 in the traveling direction. A behavioral pattern is then calculated that is capable of guiding the surface treating device 1 by the obstacle. To this end, a corresponding control command is subsequently generated to drive the wheels 16 of the surface treating device 1 in such a way that the surface treating device 1 performs a traveling motion that circumvents the obstacle.

For example, if only one of the vertical contact sensors 6 detects an impact according to one embodiment, it can be correspondingly concluded that the obstacle is present on the side of the surface treating device 1 on which the triggering vertical contact sensor 6 is located. Accordingly, and/or links between the collision signals of the contact sensors 5 can be preprogrammed in the software, which make it possible to pinpoint a specific position of the colliding obstacle given specific event parameters.

REFERENCE LIST

1 Surface treating device
2 Device housing
3 Distance measuring device
4 Collision detection device
5 Contact sensor
6 Vertical contact sensor
7 Horizontal contact sensor
8 First housing part
9 Second housing part
10 Actuation device
11 Button
12 Stop
13 Switch
14 Spring element
15 Cover element
16 Wheel
17 Brush
18 Contact element
19 Spring element
20 Contact surface
21 Recess
22 Foot

The invention claimed is:

1. A self-propelled surface treating device (1), in particular a cleaning robot, with a device housing (2) and a collision detection device (4) for detecting a collision between the surface treating device (1) and an obstacle, wherein the collision detection device (4) has at least one touch-sensitive vertical contact sensor (6), which is arranged on the device housing (2) in such a way that its detection area is vertically aligned during a movement with the surface treating device (1) conventionally oriented, so that the vertical contact sensor (6) is configured to detect a force acting vertically on the surface treating device (1), wherein the collision detection device (4) has two housing parts (8, 9) that can move relative to each other, wherein at least one of the housing parts (8, 9) is designed to extend annularly within a horizontal plane, wherein a distance measuring device (3) designed to emit an optical signal and to measure distances to obstacles is arranged inside of the annular shape as viewed in a vertical direction, and wherein the distance measuring device (3) is arranged below the annular housing part (8, 9) relative to the vertical direction.

2. The surface treating device (1) according to claim 1, wherein a first one of the housing parts (8) can be displaced relative to a second one of the housing parts (9) owing to a collision with an obstacle, wherein one of the housing parts (8, 9) has the vertical contact sensor (6), and the other housing part (9, 8) has an actuating device (10) for actuating the vertical contact sensor (6).

3. The surface treating device (1) according to claim 2, wherein the actuating device (10) has a button (11), a contact surface (20) and/or a stop (12).

4. The surface treating device (1) according to claim 2, wherein the first housing part (8) has the actuating device (10), and wherein the second housing part (9) has the vertical contact sensor (6), wherein the first housing part (8) is located above the second housing part (9) during a movement relative to a conventional orientation of the surface treating device (1).

5. The surface treating device (1) according to claim 1, wherein the vertical contact sensor (6) is located at the front on the housing part (8, 9) relative to a conventional orientation of the surface treating device (1) during a movement in the forward direction.

6. The surface treating device (1) according to claim 1, wherein the collision detection device (4) has at least one horizontal contact sensor (7), which is arranged on the device housing (2) in such a way that its detection area is aligned parallel to a direction of movement during a movement given a conventionally oriented surface treating device (1), so that the horizontal contact sensor (7) is designed to detect a force acting horizontally on the surface treating device (1).

7. The surface treating device (1) according to claim 6, comprising at least two vertical contact sensors (6) and at least two horizontal contact sensors (7), which are annularly arranged on the device housing (2) in such a way as to envelop the distance measuring device (3) as viewed in a vertical direction.

8. The surface treating device (1) according to claim 1, wherein the vertical contact sensor (6) has an electronic switch (13), an inductive or capacitive position sensor, a piezo element, a strain gauge, a conductive foam and/or a light barrier.

9. The surface treating device (1) according to claim 2, wherein a spring element (14) is arranged between the actuating device (10) and vertical contact sensor (6), so that the actuating device (10) can act on the vertical contact sensor (6) by way of the spring element (14).

* * * * *